US006215091B1

(12) United States Patent
Chung et al.

(10) Patent No.: US 6,215,091 B1

(45) **Date of Patent: *Apr. 10, 2001**

(54) PLASMA TORCH

(75) Inventors: Ki Hyung Chung; Kang Ok Lee, both of Seoul (KR)

(73) Assignee: Korea Accelerator and Plasma Research Association, Seoul (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,307

(22) Filed: Oct. 30, 1998

(30) Foreign Application Priority Data

Jun. 3, 1998 (KR) ........................................ 98-20509

(51) Int. Cl.[7] ........................................ B23K 9/00

(52) U.S. Cl. ........................ 219/121.48; 219/121.47; 219/121.51

(58) Field of Search ........................ 219/121.48, 123, 219/121.5, 121.43, 121.46, 121.52, 121.59, 121.47, 121.54; 315/111.41

(56) References Cited

U.S. PATENT DOCUMENTS 3,969,603 * 7/1976 Boughton et al. .............. 219/121.46
4,390,772 * 6/1983 Hiratake .............. 219/121.51
4,494,043 * 1/1985 Stallings et al. .............. 315/111.41
4,626,648 * 12/1986 Browning .............. 219/121.5
4,656,330 * 4/1987 Poole .............. 219/121.52
4,958,057 * 9/1990 Shiraishi et al. .............. 219/121.5
5,023,425 * 6/1991 Severance, Jr. .............. 219/121.59
5,332,885 * 7/1994 Landes .............. 219/121.47
5,416,296 * 5/1995 Walters .............. 219/121.5
5,688,417 * 11/1997 Cadre et al. .............. 219/121.52
5,717,187 * 2/1998 Rogozinski et al. .............. 219/121.54

* cited by examiner

*Primary Examiner*—Teresa Walberg
*Assistant Examiner*—Quang Van
(74) *Attorney, Agent, or Firm*—Long Aldridge & Norman LLP

(57) ABSTRACT

The plasma torch has a cathode supporter having a front end and a rear end, mounted on the body at the rear end thereof; a button-cathode for generating plasma arc, which is assembled to the front end of the cathode supporter; a hollow-cathode having an inner surface and an outer surface, surrounding the button-cathode, the inner surface of which is spaced from the button-cathode, being assembled to the cathode supporter, and being made of material with higher work function than material for the button-cathode. The plasma gas flows along the outer surface to accomplish low gas pressure between the inner surface of the hollow-cathode and the button-cathode. A multiple-solenoid coil is adapted to rotate arc root around the button-cathode and to move arc root axially along the surface of the button-cathode.

15 Claims, 2 Drawing Sheets

PLASMA TORCH

CROSS REFERENCE TO RELATED ART

This application claims priority of Korean patent application No. 1998-20509 filed on Jun. 3, 1998, the disclosure of which is incorporated herein by reference.

BACKGROUND OF THE INVENTION

1) Field of the Invention

The present invention relates to a plasma torch, more particularly, to a plasma torch that has high efficiency, the input power of which is more than 1 megawatt (MW), and the cathode of which has long life span.

2) Background of the Invention in "UIE ARC PLASMA REVIEW 1998" which illustrates many kinds of plasma torches, among them two representative plasma torches will be explained.

FIG. 2 shows one of the transferred-solid type plasma torches of the prior art, a Daido Steel brand plasma torch. This is a scaled-up version of the torch design used for cutting and welding. The long tungsten cathode is recessed behind the copper nozzle and operates in the transferred mode with argon gas. The torch is available in sizes up to about 1 MW FIG. 3 shows one of the non-transferred hollow type plasma torches of the prior art, an SKF brand, a SKF plasma torch. This design is segmented with a fixed length arc column with magnetic field coils at each end. The torch has two equal diameter copper electrodes, the capped rear electrode being connected negative. So the magnetic field makes a rotating arc root in the ups electrode and this results in long cathode life. The insulated segments between the electrodes stretch the length of the arc column to a larger length that will develop a higher arc voltage. Torches with power ratings from 100 kW to 8 MW are available. The SKF torch has a field coil for rotating the arc foot of the upstream electrode and thus can make more than 1 MW output. However efficiency of the torch is lower than the transferred type since temperature of the plasma rapidly reduces as it departs from the nozzle. To exchange the cathode, the whole assembly surrounding the cathode must be removed, which results in high exchange cost.

SUMMARY OF THE INVENTION

Therefore, it is one of the objects of the present invention to provide a plasma torch with a long life cathode and whose output is more than 1 MW.

It is another object of the present invention is to provide a plasma torch whose cathode can be easily exchanged.

It is still another object of the present invention is to provide a plasma torch whose cathode region has low pressure, which helps ignition at lower voltage.

To accomplish these objects, the present invention provides a plasma torch including

- a body having a gas supplier for supplying plasma gas;
- a cathode supporter for supporting the button-cathode;
- a button-cathode for generating plasma arc, assembled to the front end of the cathode supporter by a bolting means; and
- a hollow-cathode which surrounds the button-cathode, has a predetermined space from the button-cathode, is assembled to the cathode supporter, and is made of material with higher work function than the material for the button-cathode.

Preferably, the present invention also provides a plasma torch with multiple-solenoid coil surrounding the cathode. A moving peak current with flat current is applied to the multiple-solenoid coil in order to move arc foot on the surface of the button-cathode back and forth, which can prolong cathode life.

The button-cathode and the hollow-cathode are assembled by a bolting means, which enables easy exchange of the button-cathode which generates plasma arc and experiences wear.

The button-cathode of the invention is positioned so as to be surrounded by the hollow-cathode, which makes the pressure of the surrounding area of the button-cathode low, and thus makes ignition at lower voltage and enables stable flame of the plasma arc column generated at the button-cathode.

The plasma torch of the present invention has a hollow-cathode surrounding a hot button type cathode, so it can be called a hollow hot button-cathode torch.

BRIEF DESCRIPTION OF THE DRAWINGS

A more complete appreciation of this invention, and many of the attendant advantages thereof, will be apparent as the same becomes better understood by reference to the following detailed description when considered in conjunction with the accompanying drawings in which like reference symbols indicate the same and similar components, wherein.

DETAILED DESCRIPTION OF THE PREFERRED EMBODIMENTS

Figure 1:
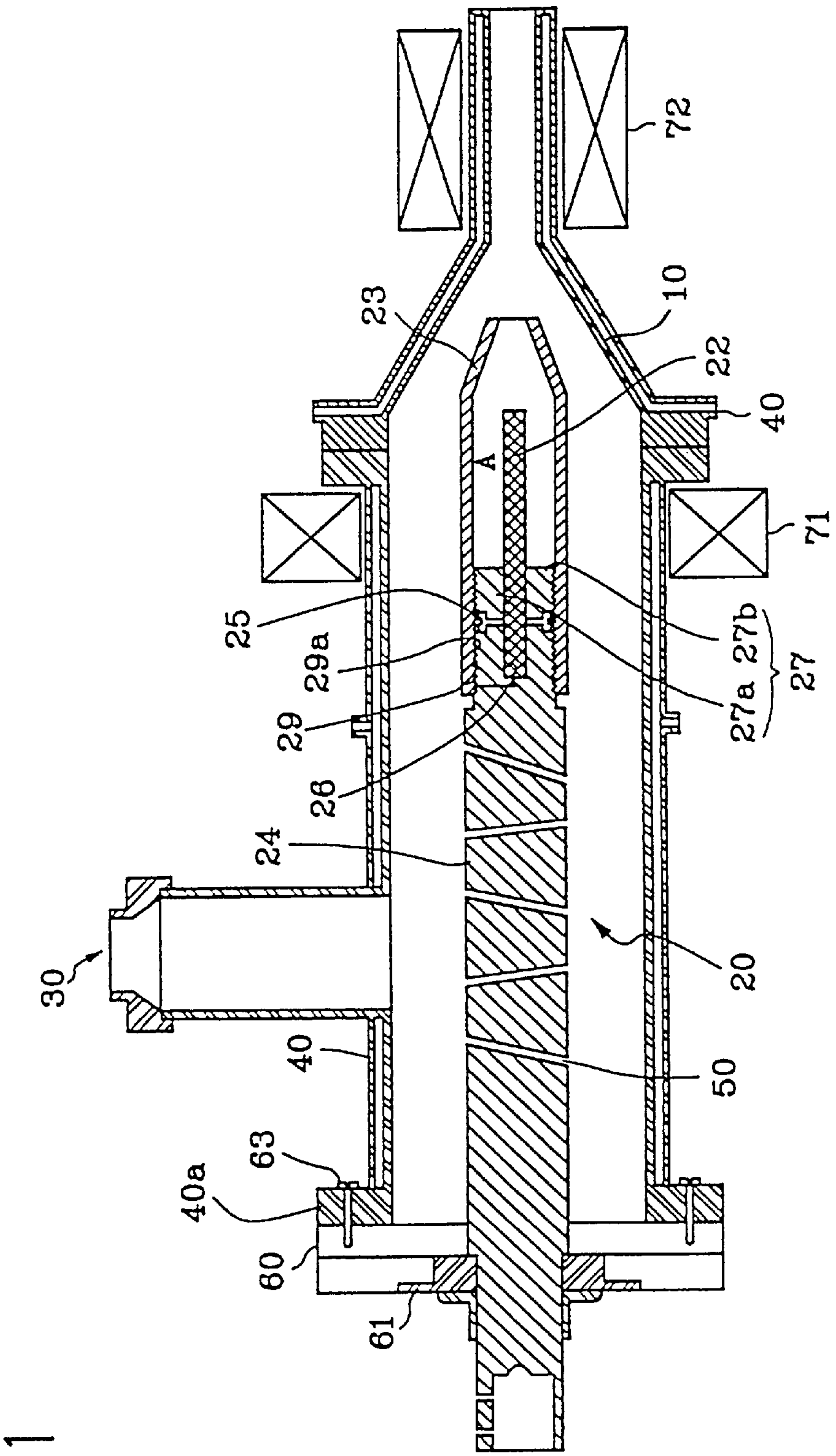
FIG. 1 is a cross sectional view of the plasma torch according to the invention.
Figure 2:
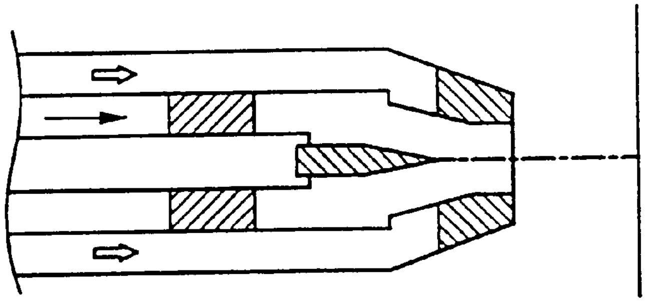
FIG. 2 PRIOR ART
FIG. 2 is a schematic cross sectional view of a Daido Steel manufactured plasma torch.
Figure 3:
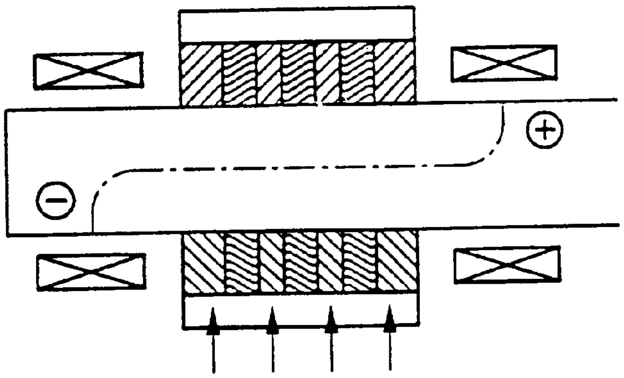
FIG. 3 PRIOR ART
FIG. 3 is a schematic cross sectional view of a SKF manufactured plasma torch.

The preferred embodiments of the invention will be explained with reference to the accompanying drawing, FIG. 1.

The torch according to the invention is essentially structured to have two electrodes, cathode 20 and anode 10, a gas inlet 30, a first multiple-solenoid coil 71 for rotating arc root of the cathode 20, and a second multiple-solenoid coil 72 for rotating arc root of the anode 10. In an other embodiment of the invention, in transferred type torch the anode 10 is not essential and can be omitted. Cathode 20 has a stick-shaped button-cathode 22 and a hollow type copper cathode 23, both of which are assembled to a cathode support 24 that is made of copper.

The copper cathode support 24 has a plurality of cooling holes for cooling cathode 20. The straight cooling holes 50 are disposed in diverse directions to increase cooling efficiency and it is preferable to be formed in a helical pattern following in the longitudinal direction of the cathode support 24. When the gas is supplied through the gas inlet 30, the gas forms turbulence while passing the cooling holes 50. The heat transfer between cathode 20 and gas increases whole heat efficiency of the torch.

The front portion 27 of the cathode support 24 has two divided parts, upper and lower parts 27_a_ and 27_b_, and a hole 26 for the button-cathode 22. The button-cathode 22 is assembled between the two parts 27_a_ and 27_b_ of the cathode support 24 through the hole 26 by a bolt 25. The cylindrical-shaped hollow-cathode 23 has teeth 29 in its interior surface, which mesh with the teeth 29_a_ formed in the outer surface of the front portion 27 of the cathode support 24. Thus between the button-cathode 22 and the hollow-cathode 23 a space A can be defined. And since a gap between the button-cathode 22, the hollow-cathode 23 and the cathode support 24 may cause contact resistance, it is preferable that the button-cathode 22 and the hollow-cathode 23 should be tightly engaged to the cathode support 24.

The button-cathode 22 is preferably made of thoriated tungsten which has small work function and thus has an easy emission of thermionic electrons, which results in a small sputtering cross section for avoidance of wear of the hollow-cathode. The thoriated tungsten can be replaced by Hafnium (Hf), other high melting point metals or metals containing thorium. To dope tungsten with 1–3 wt % thorium will result in lower work function. Since the work functions of the two metals, copper and thoriated tungsten, are different from each other, button-cathode 22 emits almost all thermionic electrons and the hollow-cathode 23 does not wear.

The anode 10 positioned in front of the cathode 20 is made of OFHC(oxygen free high-conductive copper). OFHC is copper whose oxygen is removed to increase electric conductivity, and it is often used as electric conducting material for radio frequency or microwave. The anode 10 can be made of copper alloy with zirconium or chromium.

The first of the multiple-solenoid coils 71 surrounding body 3 in the position of the hot button-cathode 22 is made of copper. If only one coil of the multiple-solenoid coils 71 receives high peak-current compared to the flat current in the other coils, there exists high magnetic flux peak on the surface of the cathode 22. And after that, if high peak-current moves to the next coil successively, the peak point of magnetic flux moves axially on the surface of the cathode 22. This makes the trap of arc roots and movement of arc roots in both axial and azimuthal direction on the surface of the cathode by Lorentz force. Therefore, the button-cathode 22 does not wear locally, but wears equally throughout the cathode 22, which helps the life of the cathode 22 to be prolonged.

The second the multiple-solenoid coil 72 surrounding the body 3 of the torch in the position of the anode 10 is also made of copper. And if this multiple-solenoid coil 72 receives current in the same way as the first multiple-solenoid coil 71, there also are the trap of arc roots and movement of arc roots in both axial and azimuthal direction on the surface of the anode by Lorentz force. Therefore the plasma arc can be focused and concentrated well, and the temperature in the arc becomes uniform. Also heat stress to the anode 10 will be reduced, which increases the life span of the anode 10.

The body 3 of the torch is essentially made of stainless steel, which is excellent in mechanical strength, in enduring corrosion, and in transmissivity of magnetic field, and has lower thermal conductivity than copper, which can reduce heat loss to the outside of the torch.

The outer surface of the body 3 is surrounded by cooling passage 40, which protects the body from being overheated, and through which air, cooling oil, or water can flow. The cooling passage 40 is formed with double jacket. The body 3 is sealed or closed by a disk-shaped rear portion 60 of insulating material or Teflon. A stainless steel plug 61, that is electrical feed through with vacuum tight, is secured to rear center of the rear portion 60 where the cathode support 24 is screwed and passes through center of the plug 61. The rear portion 60 is fixed to the body 3 by stainless steel flange **40*a* and bolts 63. And to prevent gas leakage O-ring or copper gasket (not shown) is provided between flange 40*a* and rear portion 60**.

Now the operation for the torch of this embodiment will be explained.

Gas flows into the body 3 through the gas inlet 30, and the gas pressure around the space A adjacent to the button cathode 22 is lowered, which can be explained by Bernoulli principle. Since the gas pressure around the button-cathode 22 is lowered, the plasma arc can be ignited at lower voltage and is stable, which effect can be explained by Paschen curve.

Since magnetic flux in the axial direction of the cathode 22 and to-and-fro motion of the high magnetic flux peak points can make arc root rotate and move forward and backward along the button-cathode 22. Thus the button-cathode 22 wears out equally throughout the whole cathode 22, which increases life span of the button-cathode 22.

Also due to the second multiple-solenoid coil 72, the plasma arc can be focused and concentrated well, and the temperature in the arc becomes uniform, which increases the life span of the anode 10.

When the protruded portion **22*a* of the button-cathode 22 wears out, disengaging the bolt 25 and being reassembled with the hollow-cathode 23 can move the button-cathode 22 forward. Alternatively, the button-cathode 22** can be exchanged by following the same method.

The torch of the invention has following advantages:

1) since gas pressure around cathode region A can be lowered, which helps the lowering of ignition voltage, the torch can be applied to a more stable operation;

2) since the multiple-solenoid coil around the upstream button-cathode 22 can make the upstream button-cathode 22 wear equally, the life span of the button-cathode 22 can be increased; and 3) since operating simple engaging means, such as bolts can do exchange of the upstream electrode, it does not take much time.

The torch according to the invention can be applied to a transferred type or non-transferred type torch according to the treated material. And it can be used in plasma spray coating, plasma melting and reduction for metal or non-metal, incineration process for non resoluble material, heat pyrolysis and solidification for nuclear reactor waste, decommissioning of nuclear power plants.

The output of the torch can range from small power below 1 MW to high power over 1 MW.

The arrangement described above is only illustrative of the principles of the present invention. Numerous modifications and adaptations thereof will be readily apparent to those skilled in the art without departing from the spirit and scope of the present invention.

What is claimed is:

1. A plasma torch, comprising:

a body having a gas supplier for supplying plasma gas;

a cathode supporter having a front end and a rear end, mounted on said body at the rear end thereof;

a button-cathode for generating plasma arc, which is assembled to the front end of said cathode supporter;

a hollow-cathode having an inner surface and an outer surface, surrounding said button-cathode, the inner surface of which is spaced from said button-cathode, being assembled to said cathode supporter, and being made of material with higher work function than material for said button-cathode; and wherein the plasma gas flows along the outer surface of the hollow cathode to make gas pressure low between the inner surface of said hollow-cathode and said button-cathode and plasma arc is produced between said anode electrode and said button-cathode.

2. The plasma torch according to claim 1, further comprising means for rotating arc root around said button-cathode and moving arc root axially along said button-cathode.

3. The plasma torch according to claim 2, wherein said means for rotating arc root around said button-cathode and moving arc root axially along said button-cathode is a first multiple-solenoid coil which is mounted on said body at a position of said button-cathode, and peak current is successively applied to the first multiple-solenoid coil.

4. The plasma torch according to claim 1, wherein said body has a cooling passage around said body for cooling said body.

5. The plasma torch according to claim 1, wherein pluralities of cooling holes are formed in said cathode supporter.

6. The plasma torch according to claim 1, further comprising an anode in front of said hollow-cathode.

7. The plasma torch according to claim 3, further comprising an anode in front of said hollow-cathode.

8. The plasma torch according to claim 7, further comprising a second multiple-solenoid coil mounted on said body at a position of said anode.

9. The plasma torch according to claim 1, wherein the material for said cathode supporter and hollow-cathode are copper and said button-cathode is made of thoriated tungsten.

10. The plasma torch according to claim 1, wherein the material for said cathode supporter and hollow cathode is copper and said button-cathode is made of hafnium.

11. The plasma torch according to claim 2, wherein said body has a cooling passage around said body for cooling said body.

12. The plasma torch according to claim 2, wherein pluralities of cooling holes are formed in said cathode supporter.

13. The plasma torch according to claim 3, further comprising an anode in front of said hollow-cathode.

14. The plasma torch according to claim 13, further comprising a second multiple-solenoid coil mounted on said body at a position of said anode.

15. A plasma torch, comprising:

a body having a gas supplier for supplying plasma gas, a funnel-shaped nozzle having an anode electrode defining an inner surface thereof;

a cathode supporter having a front end and a rear end, mounted on said body at the rear end thereof;

a button-cathode assembled to the front end of said cathode supporter;

a hollow-cathode elongated to said funnel-shaped nozzle having an inner surface and an outer surface spaced apart from said anode electrode of said funnel-shaped nozzle so as to define a plasma gas passage between said outer surface and said anode electrode, and surrounding said button-cathode, the inner surface of said hollow-cathode being spaced apart from said button-cathode, assembled to said cathode supporter, and being made of material with higher work function than material for said button-cathode, said plasma gas passage between said outer surface of said hollow-cathode and said anode electrode becoming narrow; and wherein the plasma gas flows from said gas supplier to said plasma gas passage along the outer surface of the hollow-cathode to make gas pressure low between the inner surface of said hollow-cathode and said button-cathode, thereby lowering a dielectric breakdown voltage and causing plasma arc between said anode electrode and said button-cathode.

* * * * *